United States Patent [19]
Xie et al.

[11] Patent Number: 5,653,535
[45] Date of Patent: Aug. 5, 1997

[54] MIXING MACHINE

[75] Inventors: Mark Mingjun Xie, Tipp City; James Philip Bascom, Troy; Harvey Albert Kasinoff, Troy; Raymond Paul Shaeffer, Troy, all of Ohio

[73] Assignee: Premark FEG L.L.C., Wilmington, Del.

[21] Appl. No.: 607,095

[22] Filed: Feb. 28, 1996

[51] Int. Cl.⁶ .................................. A21C 1/14; B29B 7/22
[52] U.S. Cl. ..................................... 366/100; 366/203
[58] Field of Search .................................. 366/348, 349, 366/285, 286, 279, 289, 222, 223, 224, 96–100, 197, 203, 207

[56] References Cited

U.S. PATENT DOCUMENTS

| | | |
|---|---|---|
| 3,151,847 | 10/1964 | Broomall . |
| 3,630,495 | 12/1971 | Carroll . |
| 3,677,100 | 7/1972 | Kajiwara . |
| 3,754,737 | 8/1973 | O'Dea . |
| 4,057,226 | 11/1977 | de Mos et al. . |
| 4,311,397 | 1/1982 | Wright . |
| 4,380,398 | 4/1983 | Burgess . |
| 4,429,624 | 2/1984 | Linn . |
| 4,472,060 | 9/1984 | Hargis . |
| 4,671,666 | 6/1987 | Herfeld .............................. 366/224 |
| 4,697,929 | 10/1987 | Muller . |
| 4,898,474 | 2/1990 | Lipson .............................. 366/286 |
| 4,919,539 | 4/1990 | Drocco .............................. 366/224 |
| 5,028,141 | 7/1991 | Stiegelmann . |
| 5,236,263 | 8/1993 | Friedland .......................... 366/224 |
| 5,372,419 | 12/1994 | Hagiwara et al. . |

FOREIGN PATENT DOCUMENTS 62101944  5/1987  Japan .

OTHER PUBLICATIONS

*hi–lo* catalog, pp. 5, 6, 7, and 40.

*Primary Examiner*—Charles E. Cooley
*Attorney, Agent, or Firm*—Thompson Hine & Flory LLP

[57]  ABSTRACT

A mixing machine comprising a housing having an upper portion and a lower portion, an attachment drive head extending downwardly from the upper portion of the housing, an attachment drive including an attachment drive shaft, the shaft being capable of driving a detachable mixing attachment, an adjustable drive train linked to the attachment drive for driving the attachment drive shaft, a motor mounted in the housing for driving the drive train, a shift lever assembly including a shift lever wherein movement of the shift lever adjusts the length of the adjustable drive train and thereby changes the speed of the attachment drive, and a mechanism mounted on the housing to prevent the shift lever from vibrating out of position during a mixing operation and to prevent a change in speed of the mixing machine.

19 Claims, 5 Drawing Sheets

MIXING MACHINE

STATEMENT OF THE INVENTION

This invention relates to a mixing machine employing a novel drive train which provides for more power and longer drive train belt life than a conventional mixing machine. This invention also relates to a mixing machine employing a novel mechanism for preventing the shifting mechanism for the drive train of the mixing machine from moving out of position due to forces and vibrations caused by the operation of the mixing machine.

BACKGROUND OF THE INVENTION

Currently in the art, two methods are employed in a mixing machine which employs variable speed pulleys to drive the mixer's mixing attachment. In a first method, the fixed center distance method, the distance between the centers of the pulleys is fixed. The fixed center distance method employs two variable speed pulleys linked by one drive belt which are used to transmit power and change the speed of the mixer. In a second method, the adjustable center distance method, the distance between the centers of one or two sets of pulleys can be adjusted. To provide a wide speed range, two sets of pulleys are required. This method employs two variable speed pulleys, two fixed diameter pulleys and two drive belts which are arranged so that they transmit power and change the speed of the mixer.

The drive train of a conventional adjustable center distance drive mixing machine with a wide range speed change is known in the art as an "extended" drive train. This type of drive train is driven by a motor which is typically positioned at or near the base of the mixing machine. This extended drive train comprises a first fixed diameter pulley which is driven by the motor. The fixed diameter pulley is linked by a drive belt to a first variable speed pulley. This first variable speed pulley is mounted on a moveable axle on which a second variable speed pulley is also mounted. The second variable speed pulley is linked via a second drive belt to a second fixed diameter pulley which is linked to the mixing head drive mechanism.

This conventional drive train has several drawbacks. To provide these mixers with a manageable size, the length of this type of drive train is limited by the height of the mixer. In these mixers, the motor which drives the drive train is mounted in the base of the mixer and the attachment drive is located in the mixer head. Typically, the distance between the centers of the first fixed diameter pulley and the first variable speed pulley and the distance between the centers of the second variable speed pulley and the second fixed diameter pulley equal approximately half of the center distance between the first fixed diameter pulley and the second fixed diameter pulley. As one can imagine, to design a mixing machine of manageable size, the distance between the first fixed diameter pulley and the second fixed diameter pulley is limited by the acceptable height of the mixing machine. The arrangement of the extended drive train requires the mixer to have a base foot print equal in length at least to the length of the motor plus the length of the motor drive shaft on which the first fixed diameter pulley is mounted.

It is known in the art that as the size of a pulley's pitch diameter decreases, the drive belt operating on that pulley will have a shorter fatigue life than if the same belt were placed on a pulley having a larger pitch diameter. The reduced fatigue life of the belt caused by the smaller diameter pulley results from the sharp degree of the bend such a pulley places in the belt. In other words, the sharper the bend placed in the belt by the pulley, the shorter the belt life will be. In conventional extended drive train mixers, the pulley on the motor drive shaft has a small pitch diameter because the size of that pulley is limited by the speed reduction ratio of the desired drive train of the mixer.

An additional problem that has plagued large volume mixing machines is known as "shifter creep". In these large volume mixing machines, a shift lever mounted on the outside of the machine is used to adjust the speed of the mixer's attachment drive. The shift lever is linked to the drive train of the attachment drive by a linkage. Movement of the shift lever in a first direction causes the speed of the attachment drive to increase while movement in a second direction causes the speed of the attachment drive to decrease. Under the forces generated by the rotation of the beaters and the vibration of the mixer, the shift lever has a tendency to vibrate out of position and change the speed of the attachment drive. As the mixing machine vibrates, the vibrations cause the shift lever to move in a direction which causes the speed of the attachment drive to increase or decrease. The undesired movement of the shift lever often results in the mixing ingredients being thrown out of the mixing bowl, overload of the mixer, increased mixing times and incomplete mixing of the ingredients in the mixing bowl.

The present invention provides two improvements over the prior art. First, the mixer provides a novel drive train for the attachment drive which provides greater power output to the mixing head and longer belt life for the belts used in the drive train than in conventional mixers. Second, the mixer provides a novel mechanism to maintain the shift lever of the mixing machine at the selected speed position and, subsequently, to provide for constant mixing at that speed until the mixer is either shut off or the speed is changed by the operator.

SUMMARY OF THE INVENTION

The mixing machine of this invention includes a housing having an upper portion and a lower portion. A mixing attachment drive head extends downwardly from the upper portion of the housing. An attachment drive is mounted in the housing and extends into the mixing attachment drive head. A motor for driving the attachment drive is mounted in the upper portion of the housing. A folded drive train, which extends downwardly from the motor in the upper portion of the housing into the lower portion of the housing and then back up into the upper portion of the housing, links the motor with the attachment drive which extends from the attachment drive head. The motor drives a drive train which is linked to a shift lever assembly, at one end, and the attachment drive, at its other end. A shift lever mounted in the shift lever assembly, which is rotatably mounted on the housing, is employed to change the speeds of the attachment drive by changing the distances between the centers of the pulleys of the drive train. The mixing machine also includes such conventional elements as a removable mixing bowl for holding ingredients to be mixed and a bowl support for supporting the mixing bowl beneath the attachment drive head.

To provide for longer belt life and more horsepower, the mixing machine of this invention includes a "folded" drive train. In a folded drive train, the motor which drives the drive train is mounted in the upper portion of the mixer housing as opposed to being mounted on or near the base of the apparatus as it is in a conventional mixer. In this invention, a first variable speed pulley is mounted on the motor drive shaft. The first variable speed pulley is linked by a first drive belt to a first fixed diameter pulley which is rotatably mounted in an adjustable pulley yoke which is mounted in the lower portion of the housing. A second variable speed pulley is mounted on an axle of the pulley yoke opposite the first fixed diameter pulley. The second variable speed pulley is linked via a second drive belt to a second fixed diameter pulley which is mounted at the end of a drive shaft which drives the attachment drive. This arrangement of the drive train provides the drive train with a folded configuration or "U"-shape which contrasts with conventional drive trains which are essentially linear in their arrangement.

The drive train of this invention provides for longer life of the belts employed in the drive train. The folded arrangement of the drive train of this invention allows for the use of longer belts which have a longer useful life than the shorter belts typically used in conventional mixers. Longer belts can be used in this invention because the distance between the motor, to which the first variable speed pulley is attached, and the pulley yoke, in which the first fixed diameter pulley and the second variable speed pulley are mounted, is greater than in conventional mixers. This folded drive train allows the pulley yoke to be mounted lower in the housing which, in turn, allows for longer belts to be used in the drive train as compared to conventional mixers in which the positioning of the moveable axle is typically located halfway between the motor and the attachment drive shaft. In conventional mixers, the moveable axle is generally placed halfway between the motor and the attachment drive shaft as a compromise to maximize the length of each belt based upon the arrangement of the drive train.

This invention also provides for longer belt life by allowing pulleys having a larger pitch diameter than pulleys used in conventional mixers to be used in the drive train. These larger pitch diameter pulleys can be used because of the positioning of the various pulleys of the drive train in the housing of the mixer. For example, the pitch diameter of the variable speed pulley used on the motor drive shaft is always larger than the fixed diameter pulley on the drive shaft of conventional mixers. This is because conventional mixers typically employ a fixed diameter pulley having a small diameter on the motor drive shaft. Conventional mixers employ small diameter pulleys on the motor drive shaft provide an initial speed reduction. On the other hand, this invention employs, on the motor drive shaft, a variable speed pulley which at its smallest diameter (for the lowest speed) measures larger than that for conventional mixers. Because it is a variable speed pulley, at higher speeds, it has a much larger diameter than the pulley used on the motor drive shaft of conventional mixers. These pulleys with a larger pitch diameter place less stress on the drive belts contributing to longer life of the belts.

To maintain the shift lever at the proper speed position during a mixing operation, the mixing machine includes a shift lever assembly which prevents the shift lever from vibrating out of position during a mixing operation, i.e., to prevent "shifter creep". The shift lever assembly includes a plate mounted on the mixer housing. At least four depressions are formed in the surface of the plate. A shift lever assembly is rotatably mounted on the plate. The shifter lever assembly hub contains at least two bearings which engage the depressions in the plate to maintain the shifter in the proper position. The bearings are biased toward the plate and into contact with the depressions by a spring. The shift lever is mounted in the hub of the shift lever assembly. The shift lever assembly is linked to a crank shaft which adjusts a linkage which, in turn, moves the drive train of the attachment drive to change the speed of the primary attachment drive and the auxiliary attachment drive.

These features and other features and advantages of the present invention will be better understood by reference to the following detailed description, the accompanying drawings and the appended claims.

DETAILED DESCRIPTION OF THE INVENTION

Figure 1:
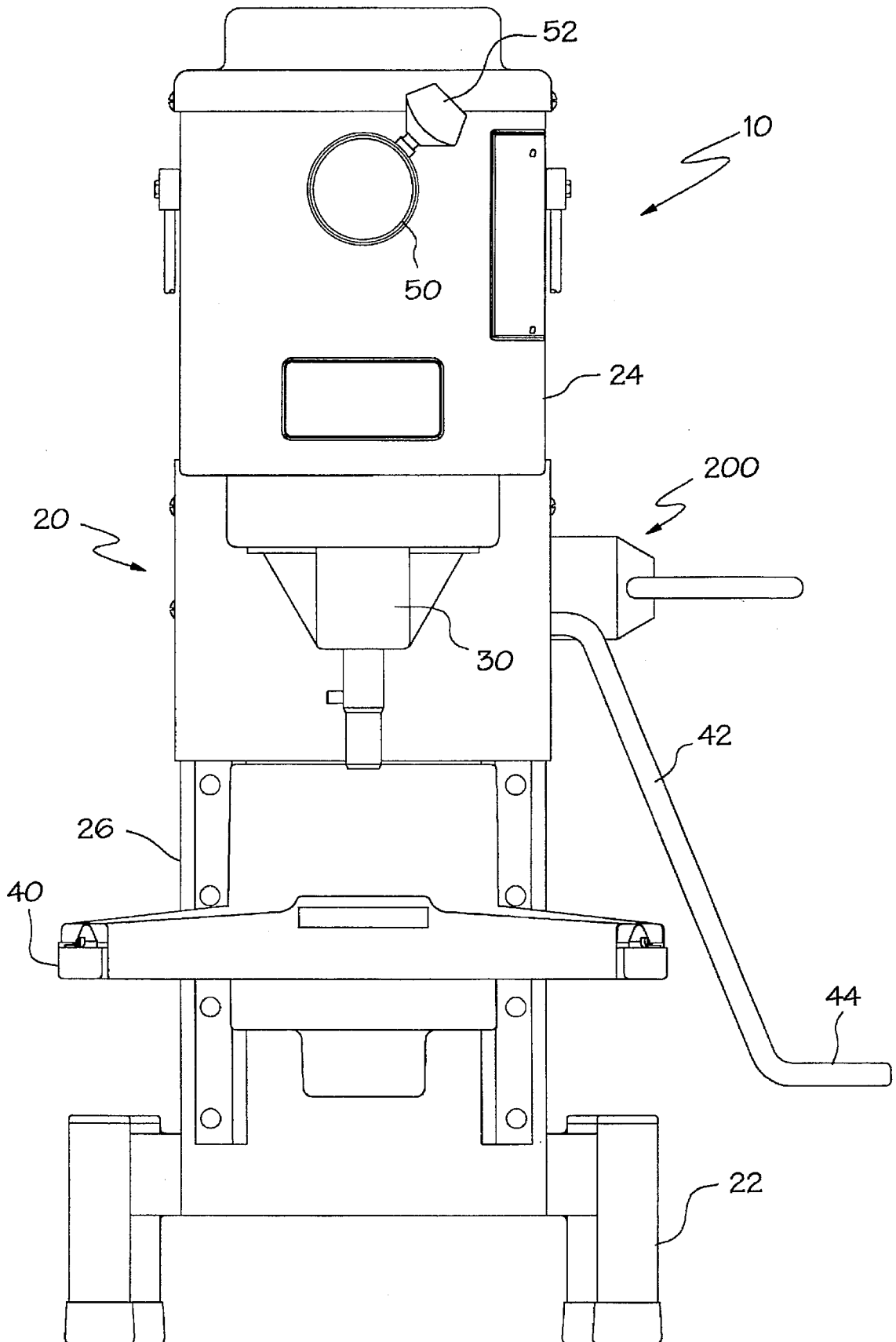
FIG. 1 presents a front view of a mixing machine.
Figure 2:
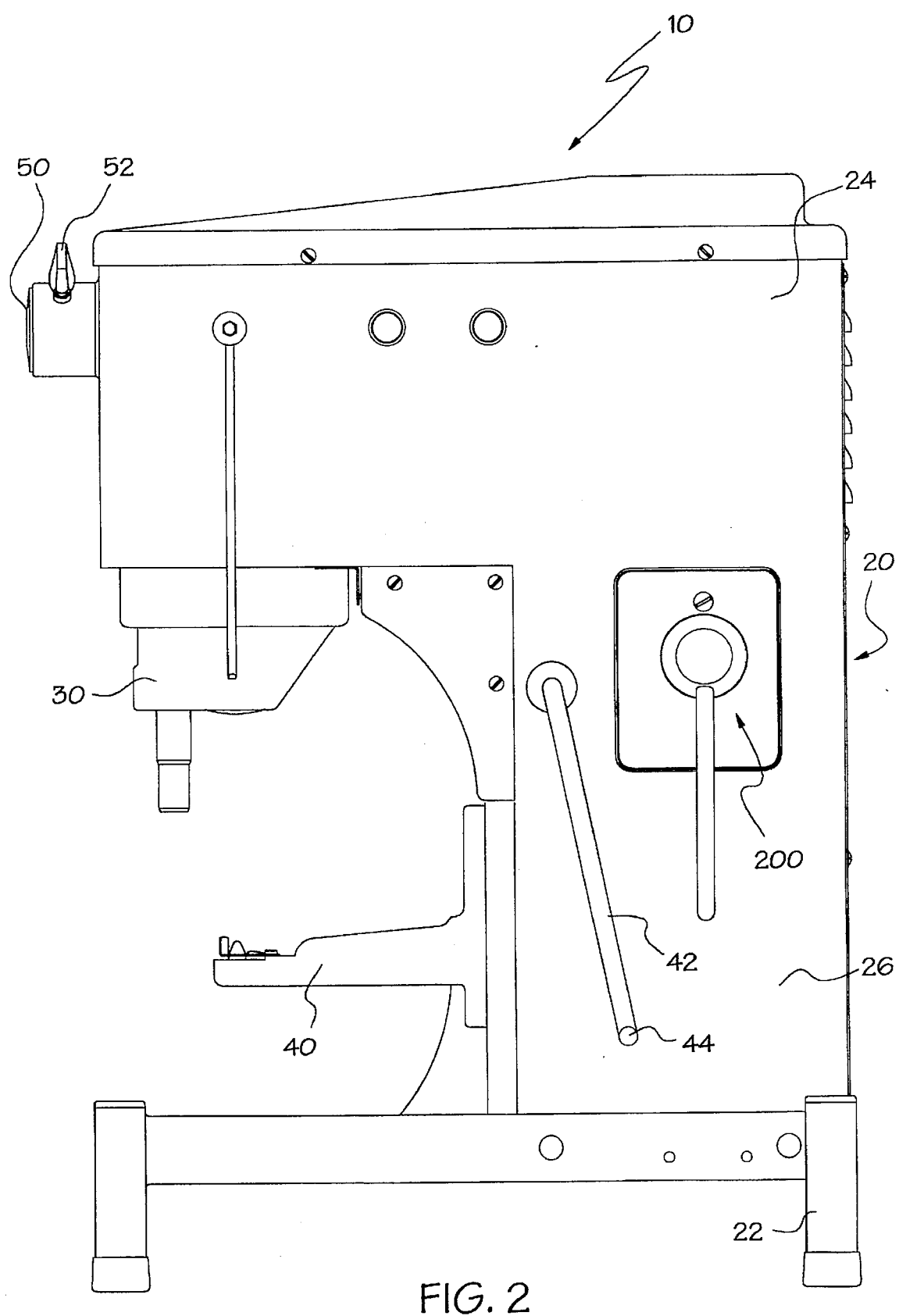
FIG. 2 presents a side view of the mixing machine of FIG. 1.

FIG. 1 presents a front view of a mixing machine 10 and FIG. 2 presents a side view of mixing machine 10. As can be seen in both FIG. 1 and FIG. 2, mixing machine 10 includes a housing 20, a mixing attachment drive head 30, a mixing bowl support 40, an auxiliary attachment port 50, and a shift lever assembly 200. Housing 20 is mounted on base 22. Housing 20 can be divided into two portions, an upper portion 24 and a lower portion 26 which is mounted on base 22. Mixing attachment drive head 30 extends from upper portion 24 of housing 20 and is linked to a drive train 100, shown in FIG. 3, which drives attachment drive head 30. Attachment drive head 30 extends downwardly from upper portion 24 of housing 20 and contains a drive train which drives a conventional, detachable primary attachment (not shown), such as, for example, a beater or dough hook, which is detachably mounted on mixing machine 10. An auxiliary attachment drive port 50, which can be used to drive an auxiliary attachment such as, for example, a meat grinder, extends horizontally from upper portion 24 of housing 20. Port 50 includes an attachment means 52 which secures the auxiliary attachment (not shown) to mixing machine 10.

Bowl support 40 supports a mixing bowl (not shown) beneath mixing attachment drive head 30. Bowl support 40 is adjustably mounted on lower portion 26 of housing 20. Crank 42 is rotatably mounted on housing 20 and is used to raise and lower bowl 40 into position beneath mixing attachment drive head 30. Handle 44 extends outwardly from crank 42 and can be used to rotate crank 42. Crank 42 is linked to an adjustment mechanism (not shown) which is used to move bowl support 40 vertically in relation to the mixing head attachment drive head 30.

Figure 3:
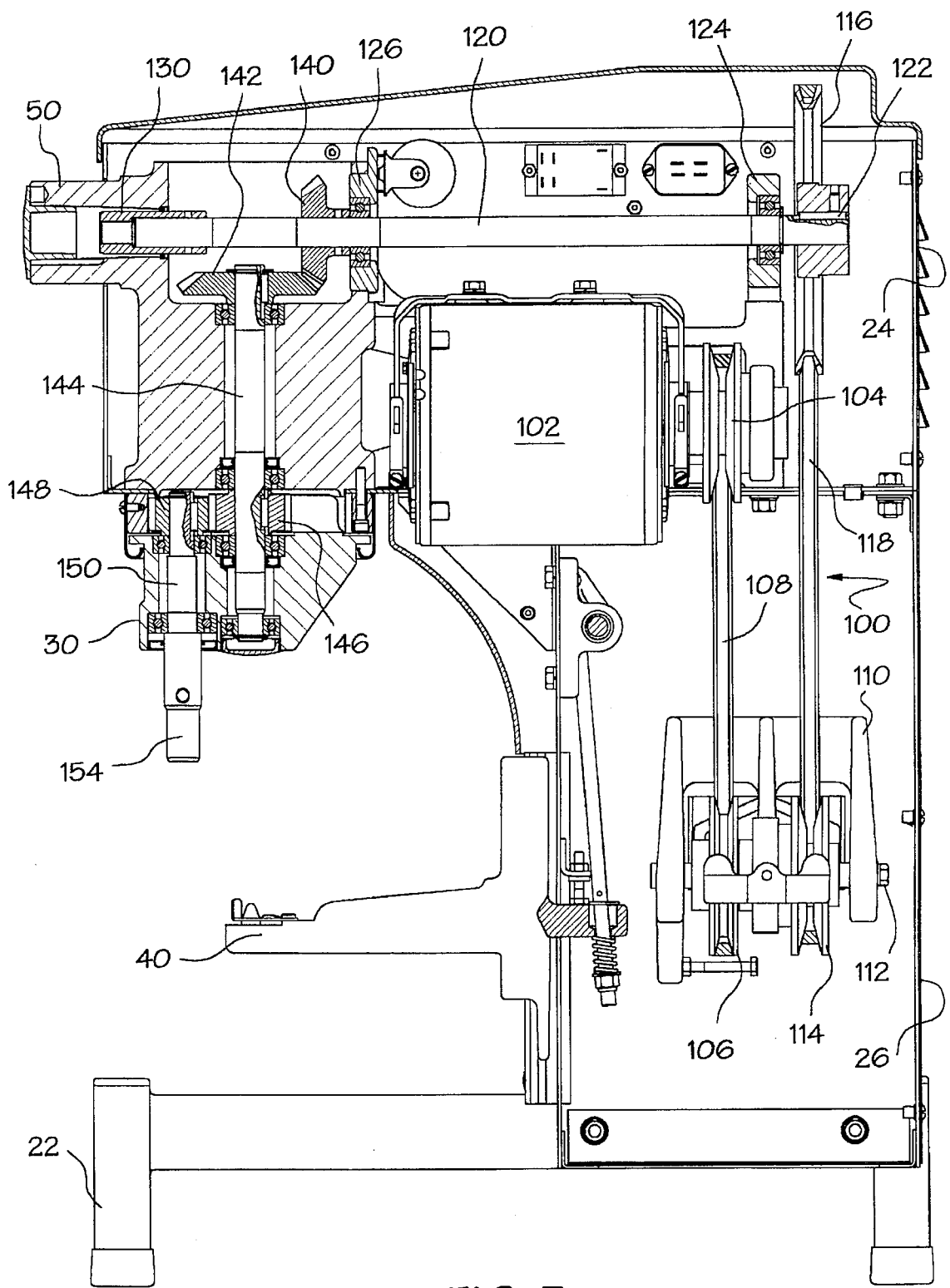
FIG. 3 presents a lateral cross sectional view of the mixing machine.

FIG. 3 presents a cross sectional view of the mixer 10 which shows main drive train 100. As shown in FIG. 3, drive train 100 is "folded" and comprises a motor 102, a first variable speed pulley 104, a first fixed diameter pulley 106, a first drive belt 108, a pulley yoke 110, a second variable speed pulley 114, a second fixed diameter pulley 116, and a second drive belt 118. A "folded" drive train is one in which, instead of being linear and extending from the base of the mixing machine to its head, motor 102 is mounted in the upper portion 24 of housing 20 and pulley yoke 110 is mounted in the lower portion 26 of housing 20 so that drive train 100 has a "folded" or "U"-shape configuration.

As shown in FIG. 3, motor 102 is mounted in upper portion 24 of housing 20 in mixing machine 10. Preferably, motor 102 is mounted behind mixing attachment drive head 30. First variable speed pulley 104 is mounted on the drive shaft (not shown) of motor 102 and is driven by motor 102. First variable speed pulley 104 drives first fixed diameter pulley 106 by means of first drive belt 108. First fixed diameter pulley 106 is rotatably mounted in pulley yoke 110 on an axle 112 which extends through yoke 110. Second variable speed pulley 114 is also rotatably mounted on axle 112. Second variable speed pulley 114 drives second fixed diameter pulley 116 by means of second drive belt 118. Second fixed diameter pulley 116 is mounted on drive shaft 120, which drives the primary attachment and the auxiliary attachment of mixer 10, by means of key 122.

First bracket 124 and second bracket 126 are mounted in upper portion 24 of housing 20. Drive shaft 120 is rotatably mounted in both first bracket 124 and second bracket 126. At one end, drive shaft 120 extends into attachment drive port 50 by means of attachment shaft 130. Near bracket 126, first bevel gear 140 is mounted on drive shaft 120. First bevel gear 140 meshes with a second bevel gear 142 which is mounted on drive shaft 144. Gear 146 is mounted on drive shaft 144 and gear 146 meshes with a gear 148 which is mounted on primary attachment drive shaft 150. Drive shaft 150 extends from head 30 and drives the primary attachment (not shown).

Figure 4:
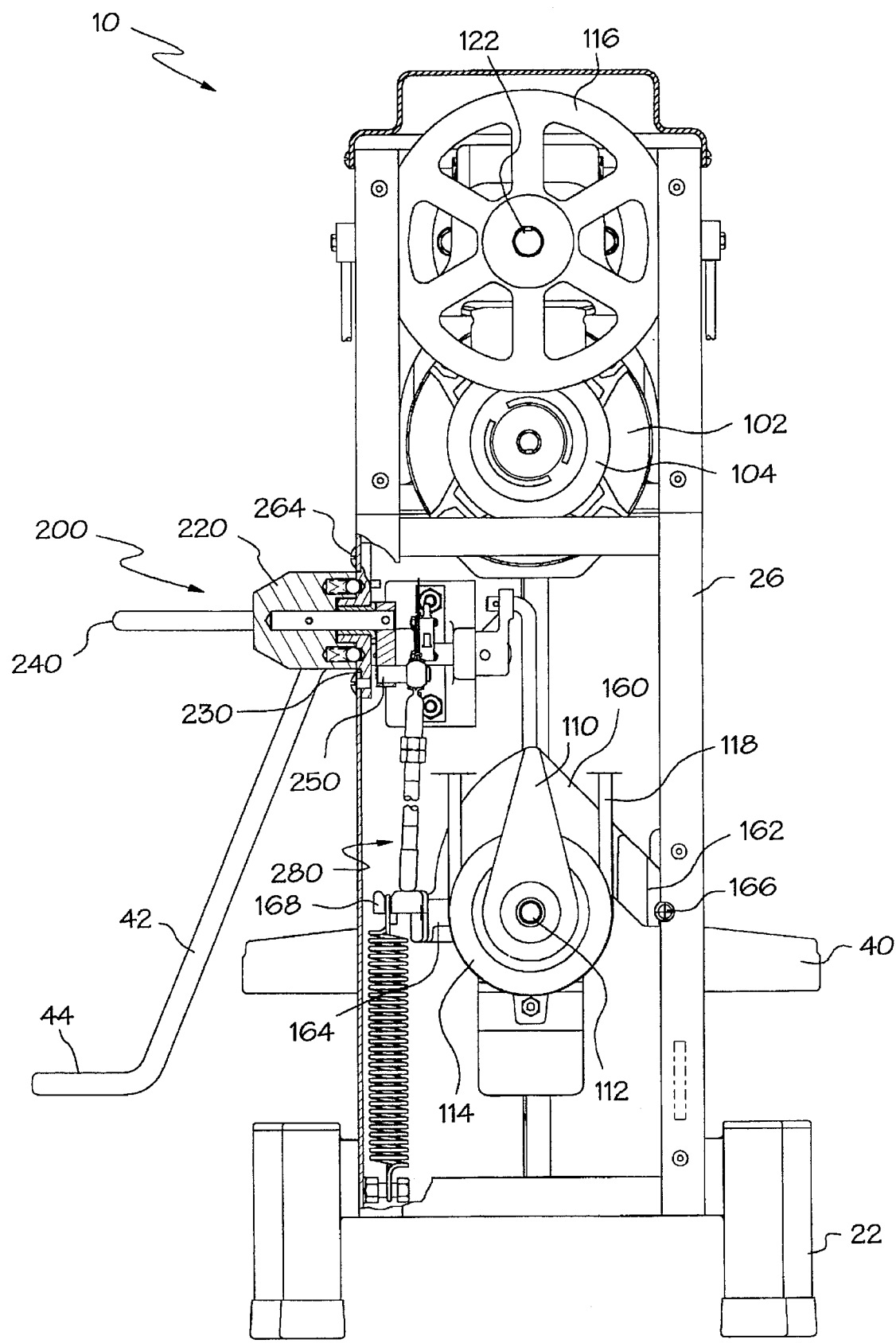
FIG. 4 presents a cross-sectional view of the rear of the mixing machine and the shift lever assembly.

FIG. 4 presents a cross sectional view of the rear of mixing machine 10. As can be seen in FIG. 4, pulley yoke 110 is mounted on rod 166 and comprises a body 160, a first end 162 and a second end 164. Rod 166 is mounted between the side walls of housing 20. First end 162 of yoke 110 is pivotally mounted on rod 166 in lower portion 26 of housing 20. Axle 112 extends through yoke 110 to retain pulleys 106 and 114 in yoke 110. Second end 164 of yoke 110 terminates in a first arm 168 and a second arm (not shown). A pair of springs 170 (one shown) engage arm 168 and the second arm. These springs, 170 and the one not shown, are provided to balance the tension on belts 108 and 118 and reduce the load on the linkage which links the shift lever assembly 200 with drive train 100, as discussed below.

As can also be seen in FIG. 4, shift lever assembly 200 includes a housing 220, a plate 230, a shift lever 240, a crank assembly 250, a shaft 270 and a linkage 280. Shift lever assembly 200 is rotatably mounted on the side of housing 20 of mixer 10. Plate 230, which has a center aperture 234, is mounted on housing 20. Housing 220 is mounted on shaft 270 which extends through aperture 234 in plate 230 and has crank assembly 250 journalled to its second end. Shift lever 240 is mounted in housing 220 as described below. Crank assembly 250 is also linked to linkage 280. Linkage 280 links shift lever assembly 200 to pulley yoke 110. Linkage 280 engages pulley yoke 110 between arm 168 and the second arm. Shift lever 240 is used to adjust the speed of attachment drive head 30 by changing the center distance between pulley 104 and pulley 106 and the center distance between pulley 114 and pulley 122, which is discussed in detail below in combination with the discussion of FIG. 3.

Figure 5:
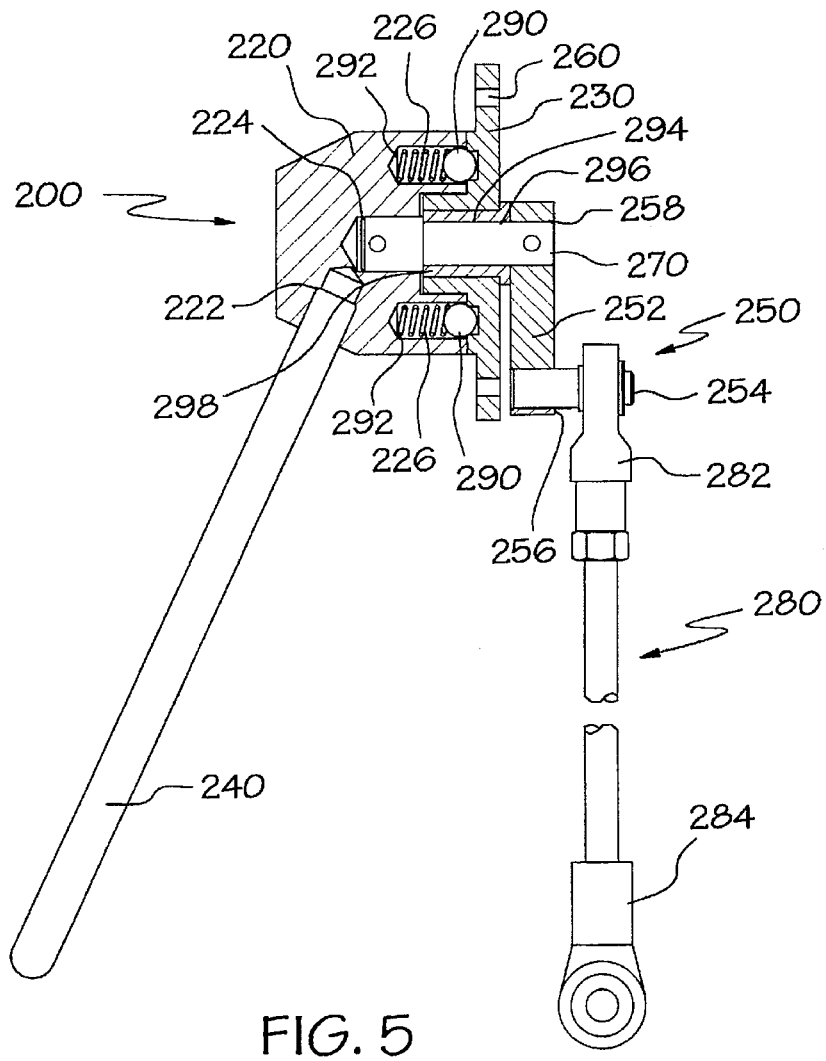
FIG. 5 presents a detailed view of the shift lever assembly.

FIG. 5 presents a detail view of shift lever assembly 200. As can be seen in FIG. 5, housing 220 of shift lever assembly 200 is rotatably mounted on plate 230 by means of shaft 270. Shaft 270 extends through aperture 234 in plate 230 and connects housing 220 with crank assembly 250. At least four cavities, a first cavity 222, a second cavity 224, and two cavities 226 are formed in housing 220. Shift lever 240 is mounted in and extends from first cavity 222. Shaft 270 is mounted in second cavity 224. Cavities 226 contain ball detentes 290 which engage plate 230. Springs 292 are also contained in cavities 226 and engage detentes 290 to urge detentes 290 into engagement with plate 230. Preferably, springs 292 are compression springs.

Crank assembly 250 of shift lever assembly 200 can also be seen in FIG. 5. Crank assembly 250 includes crank arm 252 and crank shaft 254. At one end, crank arm 252 defines a first aperture 256 into which crank shaft 254 is rotatably mounted. At a second end, crank arm 252 defines a second aperture 258 into which shaft 270 is journalled. Crank shaft 254 is rotatably mounted in crank arm 252 and engages linkage 280.

As stated above, shift lever assembly 200 is linked to drive train 100 by means of linkage 280. Linkage 280 has a first end 282 and a second end 284. The first end 282 of linkage 280 has crank shaft 254 rotatably mounted therein. The second end 284 of linkage 280 engages pulley yoke 110. The second end 284 of linkage 280 is journalled to the pulley yoke 110 so that movement of shift lever 240 causes pulley yoke 110 to pivot about rod 166.

Bearing sleeve 294 extends through center aperture 234 in plate 230. Bearing sleeve 294 is hollow and has a base portion 296 and a cylindrical portion 298. Base portion 296 engages aperture 234 and cylindrical portion 298 engages the inner periphery of aperture 234. Shaft 270 extends through the center of bearing sleeve 294. Bearing sleeve 294 facilitates the rotation of shaft 270 in aperture 234, which results in the movement of crank assembly 250.

Figure 6:
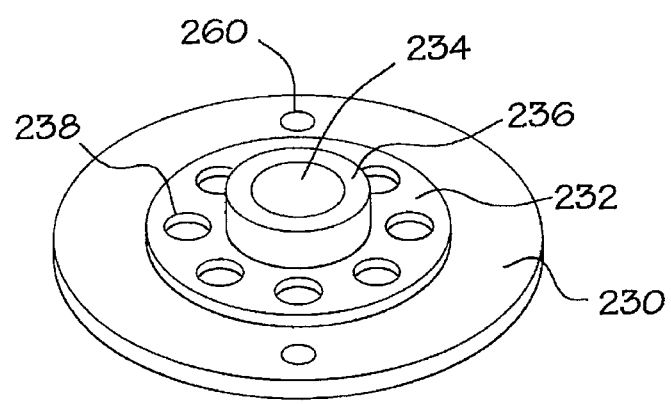
FIG. 6 presents a perspective view of the shifter plate of the shift lever assembly.

FIG. 6 presents a plan view of plate 230. Plate 230 comprises a collar 232 which extends outwardly from the center of plate 230 and a neck 236 which extends upwardly from collar 232. Center aperture 234 extends through collar 232 and neck 236. Collar 232 has depressions 238 formed in its surface. Typically, plate 230 has eight depressions 238. Plate 230 also includes, on the periphery of collar 232, apertures 260 by which plate 230 is mounted on housing 20 of mixing machine 10. Apertures 260 are engaged by fasteners 264 for securing plate 230 to housing 20 of mixing machine 10. As can be seen in FIG. 4, plate 230 is typically mounted on the inside of housing 20 of mixing machine 10 so that collar 232 and neck 236 extend through an aperture 266 in housing 20.

The primary and auxiliary attachment drives of mixing machine 10 are driven by motor 102 through drive train 100. Motor 102 drives variable speed pulley 104 by means of its drive shaft (not shown). Pulley 104 then drives fixed diameter pulley 106 by means of drive belt 108. Variable speed pulley 114 is then driven by pulley 106 because pulley 106 and pulley 114 are mounted on the same axle 112 in pulley yoke 110. Pulley 114 then drives fixed diameter pulley 116 by means of belt 118.

Pulley 116 drives drive shaft 120 by being mounted on drive shaft 120. Drive shaft 120 rotates in brackets 124 and 126. Drive shaft 120, in turn, rotates first bevel gear 140 which meshes with and rotates second bevel gear 142. Bevel gear 142 drives drive shaft 144. Drive shaft 144 rotates primary attachment drive shaft 150 by means of gear 146 which is mounted on drive shaft 144 and which engages gear 148 mounted on drive shaft 150. Drive shaft 120 may also be used to drive an auxiliary attachment which is attached to mixer 10 at the auxiliary attachment port 50 by screw 52. Drive shaft 120 directly drives the auxiliary attachment which is coupled directly to drive shaft 120 via attachment shaft 130 through auxiliary attachment port 50.

Because first variable speed pulley 104 is mounted on the drive shaft of motor 102 rather than a fixed diameter pulley being mounted on the drive shaft of motor 102, mixing machine 10 can produce more horsepower than conventional mixers through the first belt. Because variable speed pulleys produce nearly constant output torque, a variable speed pulley mounted on the drive shaft of motor 102 will transmit higher horsepower at higher motor speeds than would a variable speed pulley mounted on axle 112 of pulley yoke 110. This occurs because, in conventional mixers, the speed of axle 112, on which the variable speed pulley is mounted, has already been reduced through the use of a fixed pitch diameter pulley on the motor drive shaft. Typically, the fixed pitch diameter pulley used in conventional mixers has a fixed, small pitch diameter to provide an initial speed reduction for the drive train. On the other hand, the variable speed pulley used in conjunction with this invention provides, at its smallest diameter (i.e. lowest speed), a diameter larger than that of conventional mixers. Because a variable speed pulley is used, at higher speeds the radius of the pulley is much larger than that used in conventional mixers. This invention produces more horsepower on the first belt because a variable speed pulley mounted on the motor drive shaft does reduce the speed as much as the fixed pitch diameter pulley which is employed in conventional mixers.

To avoid the "creep" caused by the vibration of the mixing machine 10 during its operation and to maintain the shift lever assembly 200 at the preselected speed position on housing 20, shift lever assembly 200 contains detentes 290 which engage depressions 238 in plate 230. Springs 292 bias detentes 290 into engagement with depressions 238 in plate 230. The engagement of detentes 290 and depressions 238 in plate 230 inhibits shift lever assembly 200 from vibrating out of the selected speed position. Although the biasing force provided by springs 292 can be overcome by movement of the shift lever 240, the biasing force of springs 292 is sufficient to maintain detentes 290 in position in depressions 238 while the mixing operation is in process. Once shift lever 240 has been moved to the preselected position indicating the speed of the attachment drive, detentes 290 are biased by springs 292 into position in depressions 238 to prevent movement of housing 220 and, subsequently, shift lever 240 out of position.

To change the speed of drive train 100 of mixing machine 10, shift lever 240 is moved. To increase the speed of drive train 100, shift lever 240 is moved in a first direction. To decrease the speed of the attachment drive, shift lever 240 is moved in a second direction. The operator must apply sufficient force to shift lever 240 to overcome the biasing force of springs 292 on detentes 290 and to cause housing 220 to rotate. This force causes detentes 290 to dislodge from depressions 238. Once detentes 290 have been dislodged from depressions 238, housing 220 can be moved to rotate shaft 270. Once shift lever 240 has been moved to the desired speed position, springs 292 urge detentes 290 into engagement with depressions 238 to maintain shift lever assembly 220 in the desired position.

The rotation of shaft 270 moves crank assembly 250. Particularly, rotation of shaft 270 causes crank arm 252 to rotate. As crank arm 252 is rotated, crank shaft 254 is rotated in the same radial direction as shaft 270. As crank shaft 254 is moved, first end 282 of linkage 280 is also moved. As first end 282 of linkage 280 is moved, second end 284, which links shift lever assembly 200 with drive train 100 of mixing machine 10, is also moved.

The movement of the second end of linkage 280 causes pulley yoke 110 to pivot about rod 166 toward or away from motor 200. The movement of yoke 110 away from motor 102 reduces the pitch diameters of variable speed pulleys 106 and 114 and causes the speed of drive shaft 120 to decrease. A decrease in the speed of drive shaft 120 results in a corresponding decrease in speed of the primary attachment drive and/or the auxiliary attachment drive. A reduced speed is used to mix heavy loads. Conversely, movement of pulley yoke 110 toward motor 102 increases the pitch diameters of pulleys 106 and 114 which causes an increase in the speed of drive shaft 120. An increase in the speed of shaft 120 is used for light loads. Spring 170 and the spring, which is not shown, are attached to pulley yoke 110 at arm 168 and the other arm, which is not shown, to maintain balance between the tension on belts 108 and 118 and to reduce the load on linkage 280.

Although shift lever assembly 200 has been described herein as having two detentes 290, one skilled in the art will appreciate that shift lever assembly 200 can have as few as one bearing and up to as many bearings as there are depressions 238 in plate 230. However, shift lever assembly will preferably contain two detentes 290. One skilled in the art will also appreciate that for each bearing 290 there will be a corresponding spring 292. Although plate 230 has been described herein as having eight depressions 238, one skilled in the art will appreciate that plate 230 will have as many depressions 238 as are necessary to function with this invention. The number of depressions 238 in plate 230 is limited by the size of detentes 290, the diameter of plate 230 and the diameter of neck 236, among other considerations.

Having described the invention in detail, it will be apparent that numerous variations and modifications are possible without departing from the spirit and scope of the invention as defined by the following claims.

What is claimed is:

1. A mixing machine comprising:

a housing having an upper portion and a lower portion;

an attachment drive head extending downwardly from the upper portion of the housing;

an attachment drive including an attachment drive shaft, the shaft being capable of driving a detachable mixing attachment;

an adjustable drive train linked to the attachment drive for driving the attachment drive shaft;

a motor mounted in the housing for driving the drive train;

a shift lever assembly including a shift lever wherein movement of the shift lever adjusts the length of the adjustable drive train and thereby changes the speed of the attachment drive; and a mechanism mounted on the housing to prevent the shift lever from vibrating out of position during a mixing operation and to prevent a change in speed of the mixing machine.

2. The mixing machine of claim 1 wherein the shift lever assembly includes a hub from which the shift lever extends and the mechanism comprises:

a plate mounted on or in the housing, the plate having a plurality of depressions formed therein;

the hub rotatably mounted on the plate, a first end of the shift lever being mounted in the hub; and at least two spring biased ball detentes in the hub, the detentes engaging the depressions to maintain the shift lever assembly in position during the mixing operation to prevent the shift lever from vibrating out of position during the mixing operation.

3. The mixing machine of claim 2 wherein the ball detentes are mounted in cavities in the hub of the shift lever assembly.

4. The mixing machine of claim 3 wherein the shift lever assembly further includes a rod which is rotated by the shift lever and a crank shaft linked to the rod.

5. The mixing machine of claim 4 wherein the drive train is a folded drive train comprising:

a pulley yoke adjustably mounted in the lower portion of the housing;

an axle mounted in the pulley yoke;

a first variable speed pulley mounted on the motor drive shaft;

a first fixed pitch diameter pulley mounted on the axle in the pulley yoke;

a first drive belt mounted on the first variable speed pulley and the first fixed pitch diameter pulley so that the first variable speed pulley drives the first fixed pitch diameter pulley;

a second variable speed pulley mounted on a second end of the axle in the pulley yoke;

a second fixed pitch diameter pulley mounted on the attachment drive shaft; and a second drive belt mounted on the second variable speed pulley and the second fixed pitch diameter pulley;

wherein the motor is mounted in the upper portion of the housing so that the first drive belt extends downwardly from the motor to the pulley yoke in the lower portion of the housing and the second drive belt extends upwardly from the yoke to the attachment drive shaft.

6. The mixing machine of claim 5 wherein the motor is mounted in the upper portion of the housing behind the attachment drive head.

7. The assembly of claim 6 wherein the plate includes eight depressions.

8. The assembly of claim 7 wherein the cavities for the ball detentes in the hub are located approximately 180° apart.

9. A mixing machine comprising:

a mixer housing having an upper portion and a lower portion;

an attachment drive head extending from the upper portion of the housing;

an attachment drive including an attachment drive shaft mounted in the upper portion of the mixing machine for driving a mixing attachment removably mounted in the drive head;

a motor for driving the attachment drive shaft; and a folded drive belt train extending downwardly from the attachment drive shaft to a pair of pulleys and upwardly from the pulleys to the motor driving the attachment drive, at least one of the pulleys being a variable speed pulley.

10. The mixing machine of claim 9 wherein the folded drive train comprises:

a pulley yoke adjustably mounted in the lower portion of the housing;

an axle mounted in the pulley yoke;

a first variable speed pulley mounted on the motor drive shaft;

a first fixed pitch diameter pulley mounted on the axle in the pulley yoke;

a first drive belt mounted on the first variable speed pulley and the first fixed pitch diameter pulley so that the first variable speed pulley drives the first fixed pitch diameter pulley;

a second variable speed pulley mounted on a second end of the axle in the pulley yoke;

a second fixed pitch diameter pulley mounted on the attachment drive shaft; and a second drive belt mounted on the second variable speed pulley and the second fixed pitch diameter pulley;

wherein the motor is mounted in the upper portion of the housing so that the first drive belt extends downwardly from the motor to the pulley yoke in the lower portion of the housing and the second drive belt extends upwardly from the yoke to the attachment drive shaft.

11. The mixing machine of claim 10 wherein the motor is mounted in the upper portion of the housing behind the attachment drive head.

12. The mixing machine of claim 11 further comprising:

a shift lever assembly including a shift lever wherein movement of the shift lever adjusts the length of the drive train and thereby changes the speed of the attachment drive; and a mechanism mounted on the housing to prevent the shift lever from vibrating out of position during a mixing operation and to prevent a change in speed of the mixing machine.

13. The mixing machine of claim 12 wherein the shift lever assembly includes a hub from which the shift lever extends and the mechanism comprises:

a plate mounted on or in the housing, the plate having a plurality of depressions formed therein;

the hub rotatably mounted on the plate, a first end of the shift lever being mounted in the hub; and at least two spring biased ball detentes in the hub, the ball detentes engaging the depressions to maintain the shift lever assembly in position during the mixing operation to prevent the shift lever from vibrating out of position during the mixing operation.

14. The mixing machine of claim 13 wherein the shift lever assembly further includes a rod which is rotated by the shift lever and a crank shaft linked to the rod.

15. The assembly of claim 14 wherein the ball detentes are mounted in cavities in the shifter hub.

16. The assembly of claim 15 wherein the plate includes eight depressions.

17. The assembly of claim 16 wherein the bearings are mounted in the hub and located approximately 180° apart.

18. The mixing machine of claim 10 wherein the pulley yoke is adjustably linked to the housing by a spring.

19. The mixing machine of claim 18 wherein the spring balances the tension in the drive belts.

* * * * *